Patented Dec. 30, 1941

2,267,829

UNITED STATES PATENT OFFICE 2,267,829

MANUFACTURE OF VINYLMETHYLKETONE

Heinrich Lange and Otto Horn, Frankfort-on-the-Main-Hochst, Germany, assignors to I. G. Farbenindustrie Aktiengesellschaft, Frankfort-on-the-Main, Germany No Drawing. Application September 29, 1938, Serial No. 232,307. In Germany October 28, 1937

7 Claims. (Cl. 260—593)

The present invention relates to an improved manufacture of vinylmethylketone.

Owing to the presence of diacetyl (boiling at 88° C.) and other colored compounds, vinylmethylketone (boiling at 87° C. to 88° C.) is obtained from vinylacetylene and water, in the presence of mercury as a catalyst, in the form of a yellow to yellow-green product which cannot be rendered colorless by distillation. The polymerisation products from this ketone are also yellow; this coloration interferes with the use of the products for various industrial purposes. Attempts have been made to destroy this yellow coloration by bleaching agents.

Now we have found that colorless vinylmethylketone is obtainable in a very simple and smooth manner by heating the yellow colored crude ketone for a short time in the presence of an inert diluent, suitably in water, and working it up in the usual manner. The diluent may be present in its liquid phase and, therefore, act as a solvent. Alternatively the process may be performed in such a manner that the ingredients are treated in the gaseous or vaporous phase.

The vinylmethylketone forms, after this pretreatment and after subsequent distillation, a colorless liquid, clear as water, which yields colorless polymerization products.

The temperatures to which the crude vinylmethylketone is heated are preferably at least about 80° C. The upper limit is merely given by the temperature at which a thermal decomposition of the vinylmethylketone takes place. The ketone may thus be heated in liquid organic solvents or in the vapors thereof up to temperatures of about 300° C.; in the presence of steam vaporous ketone may even be heated up to about 500° C., but the application of such high temperatures is not necessary.

The crude vinylmethylketone is heated until a test portion yields a colorless distillate. With the aid of such tests the duration of the necessary heating may readily be determined in each particular case. It depends, of course, on the height of the temperature chosen. In general the time necessary for heating is about 15 minutes at about 80° C. and about a few minutes at about 100° C.

The diluents applied must be inert, i. e. they must be of such nature that they cannot chemically react with the vinyl-methylketone at the reaction temperature applied. Suitably such diluents are used as may readily be separated from the vinyl methyl ketone after the heating such as especially water or organic solvents which may be separated from the vinyl-methylketone by distillation. Besides water and water vapor there may, for instance, be used the following: benzene, toluene, xylene, naphthalene, the methylnaphthalenes, the hexanes, heptanes and octanes, dimethylether, diethylether, acetone, methylethylketone, diethylketone; furthermore nitrogen, hydrogen, carbon dioxide, methane, ethane, propane, butane.

Preferably the liquid diluents as well as the gaseous or vaporous diluents are used in at least the same quantity by volume as the liquid or vaporous vinyl-methylketone.

The following examples serve to illustrate the invention, but they are not intended to limit it thereto; the parts are by weight:

(1) In a vessel, provided with a stirrer, containing 3 parts of water at about 90° C. 1 part of yellow colored crude vinylmethylketone is run in and the whole is further stirred for 15 minutes; during this time the vinylacetylene dissolved in the crude ketone is evolved. The solution of ketone and water is distilled in a current of steam, then worked up in the usual manner and dried. By distilling the ketone thus pre-treated pure vinyl-methylketone is obtained in the form of a colorless liquid, clear as water.

(2) 1 part of toluene is heated to boiling together with 1 part of yellow colored crude vinylmethylketone for 30 minutes in a reflux apparatus and subsequently distilled by means of steam, dried and fractionated in a column. The vinylmethylketone obtained thereby is a colorless liquid, clear as water.

(3) 1 part of yellow colored crude vinylmethylketone is vaporized in 1 part of steam and the mixture is passed through a tube heated to 120° C. and then condensed by cooling. After working up the ketone in the usual manner and drying, the vinylmethylketone is obtained on distillation in a column still in the form of a colorless liquid, clear as water.

We claim:

1. In the process of decolorizing a yellowish colored crude vinyl methyl ketone produced from vinyl acetylene and water in the presence of mercury as a catalyst, the step which comprises heating said crude vinyl methyl ketone at temperatures of at least 80° C. in the presence of an inert diluent until a colorless product is obtained upon distilling the mixture.

2. The process as defined in claim 1 wherein the inert diluent is a liquid.

3. The process as defined in claim 1 wherein the inert diluent is present in the form of vapor.

4. The process as defined in claim 1 wherein the inert diluent is an inert gas.

5. The process as defined in claim 1 wherein the inert diluent is water.

6. The process as defined in claim 1 wherein the inert diluent is toluene.

7. The process as defined in claim 1 wherein the inert diluent is water employed in the form of vapors and wherein the temperature of heating is about 120° C.

HEINRICH LANGE.
OTTO HORN.